US007036254B1

(12) United States Patent
Jones et al.

(10) Patent No.: US 7,036,254 B1
(45) Date of Patent: May 2, 2006

(54) DISPLAY

(75) Inventors: Donald Elston Jones, Union, OH (US); Douglas Arthur Kline, West Carrollton, OH (US)

(73) Assignee: Neff Packaging, Inc., Dayton, OH (US)

( * ) Notice: Subject to any disclaimer, the term of this patent is extended or adjusted under 35 U.S.C. 154(b) by 20 days.

(21) Appl. No.: 10/174,083

(22) Filed: Jun. 18, 2002

(51) Int. Cl.
*G06F 11/04* (2006.01)

(52) U.S. Cl. ........................................ 40/495; 116/318

(58) Field of Classification Search ............. 40/124.01, 40/124.06, 124.09, 113, 115, 486, 495; 116/298, 116/308, 318; 446/151, 152; 235/78 R
See application file for complete search history.

(56) References Cited

U.S. PATENT DOCUMENTS 1,996,390 A * 4/1935 Stone .......................... 40/495
2,016,445 A * 10/1935 Massey ....................... 40/495
3,103,080 A * 9/1963 Desmond ..................... 40/495
3,471,956 A * 10/1969 Walters ....................... 40/495
3,559,321 A * 2/1971 Helms ......................... 40/421
3,718,519 A * 2/1973 Montgomery ............... 156/250
3,939,586 A * 2/1976 Clark .......................... 40/495
5,152,090 A 10/1992 Jacobsen
5,374,461 A * 12/1994 Bromberg .................... 428/43
6,085,451 A 7/2000 Riehle

* cited by examiner

*Primary Examiner*—Brian K. Green
(74) *Attorney, Agent, or Firm*—R. William Graham

(57) ABSTRACT

A display is disclosed as having a first panel, a second panel, and a third panel. The third panel is retained by and between the first and second panels in a manner in which at least part of the third panel is exposed. An indicia is printed on the exposed part of the third panel which includes an integrally formed detachable portion which is fixably connectable to one of the first and second panels and which provides a bearing surface upon which the third panel rotates. The first and second panels are adhered to one another in a manner to permit rotation of the third panel member there between.

4 Claims, 3 Drawing Sheets

DISPLAY

BACKGROUND OF THE INVENTION

1. Field of the Invention

The present invention relates to displays. More particularly, the invention is directed to a novel display which incorporates a panel member capable of being rotatably disposed within a confined predetermined space between two enclosing panel members and further is directed to a method of making the same.

2. Related Art

The art in the field of display packages is extensive. As related to display packages which incorporate connected rotating panels, there have been several attempts to provide displays with such features. Typically, two generally planar panel substrates are movably connected to each other by a rivet. This enables one substrate, commonly a circular panel, to be rotated with respect to a fixed panel.

Others have tried omitting the rivet by cutting a circular opening in a panel, gluing the cut panel to a second panel, inserting the circular portion in the cut panel, and applying glue to a third panel and mating it to the other side of the cut panel. One of the second and third panels is configured to leave a portion of the circular portion revealed. This method of manufacture has drawbacks in requiring multiple gluing operations and increased chance of glue smearing from an intended surface to an area where the circular portion is retained. Further, the circular portion is required to be maintained in place manually when precut as described above. Otherwise, the circular portion is cut out once the panels are connected which is a more cumbersome approach using a post gluing cutting process.

None of the current displays have met with great commercial success. Accordingly, the present invention overcomes the deficiencies in the art.

BRIEF SUMMARY OF THE INVENTION

It is an object to improve displays.

It is another object to improve the method of manufacturing displays.

It is a further object to improve displays having moving parts.

It is yet another object to reduce cost of manufacturing displays having moving parts.

It is still another object to simplify the manufacture of displays having moving parts.

Accordingly, the present invention is directed to a display. The display has a first panel member, a second panel member, and a third panel member. The third panel member is retained by and between the first panel member and second panel member in a manner in which at least part of the third panel member is exposed. An indicia is printed on the exposed part of the third panel member. The third panel member includes an integrally formed detachable portion which is fixably connectable to one of the first and second panel members and which provides a bearing surface upon which the third panel member rotates. The first and second panel members are adhered to one another in a manner to permit rotation of the third panel member therebetween.

The detachable portion can be a perforated circular portion formed within the third member such that when the circular portion is glued, for example, to one or more of the other panels and the first and second panel members enclose about the third panel in a manner to retain the same, the third panel can be forcibly rotated in a manner which causes the detachment of the circular portion from the third panel. Thus, the third panel member rotates about the circular portion. Additionally, the first, second and third panel members can be spot-glued from a single concurrent step, for example, to one another in a manner to permit the third panel member to freely rotate with respect thereto.

Preferably, the first, second and third panel members can be integrally formed and interconnect to one another. The panel members can be configured to fold on each other with the third panel member being interposed between the first and second panel members.

A method of forming a display is also provided. The method includes the steps of shaping at least three panels from a single substrate, wherein the three panels are capable of being disposed upon one another such that one of the panels is interposed between the other two panels, and in a manner in which at least part of the interposed panel is exposed. An integral detachable portion is formed in the interposed panel which fixably connects to the one of the other two panels and provides a bearing surface about which a remaining rotatable portion of the interposed panel rotates. The method further includes the step of rotating the interposed panel to cause detachment of the detachable portion. The method also calls for applying a printed indicia on a remaining portion of the interposed panel in order to be the viewable part.

Other objects and advantages will be readily apparent to those skilled in the art upon viewing the drawings and reading the detailed description hereafter.

DETAILED DESCRIPTION OF THE INVENTION

Figure 1:
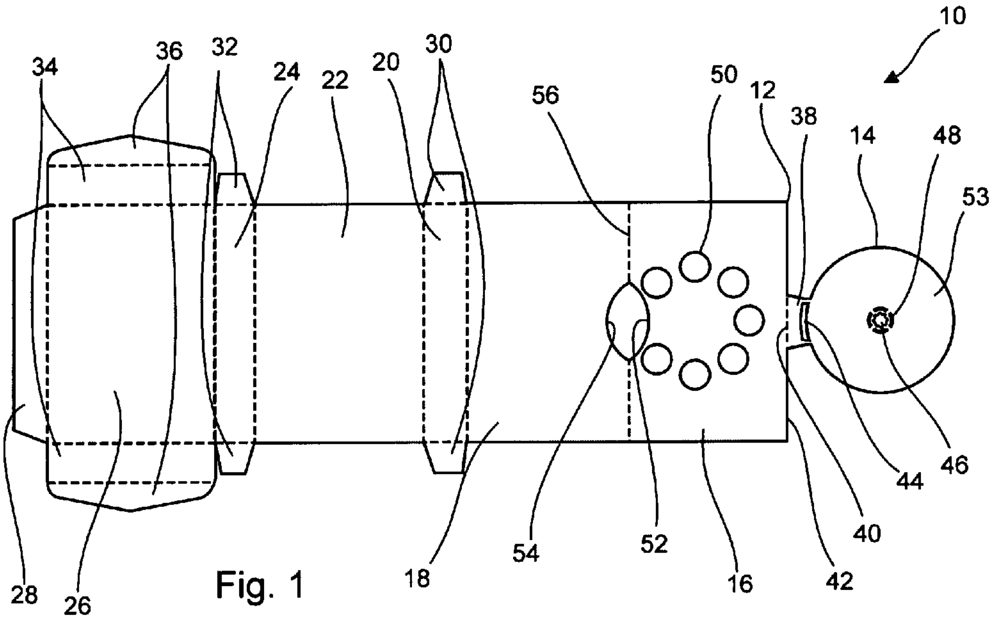
FIG. 1 is a plan view of an embodiment of the present invention in an unfolded condition.

Referring now to the drawings, the present invention is directed to a display which is denoted by the numerals 10, 10' and 10". By way of example, the display 10 will be discussed in detail with the understanding that similarly shown parts for embodiments 10' and 10" are intended to be covered by the discussion of display 10. Also, the display 10 is shown here as taking the form of a container when assembled in FIG. 4, but the concepts disclosed herein can be used in various displays such as point of purchase displays, for example.

The display 10 can include a substantially planar substrate 12 having formed therein by way of die stamp creasing, for example, a plurality of generally planar panel members 14, 16, 18, 20, 22, 24, 26 and 28 and tab portions 30, 32, 34 and 36, wherein the panel member 20 is connected to and forms part of the container and panel members 22, 24, 26 and 28 and tab portions 30, 32, 34 and 36 form remaining parts of the container. The panel member 14 is shown here as die cut in a generally cylindrical shape having a detachable connecting tab 38 which is connected to panel member 16 and which is creased with a fold 40 and is co-linear with an edge 42 of the panel member 16. The detachable tab 38 is detachably connected to the panel member 14 along a perforated segment 44.

The panel member 14 also includes a generally central circular detachable portion 46. Surrounding the portion 46 is likewise formed with a perforated portion 48 about the detachable portion 46.

The panel member 16 is by way of example formed with a plurality of cutouts 50 and cutout 52. The cutouts 50 are spatially oriented to generally align with a face of remaining rotating panel portion 53 when disposed thereagainst. Likewise, cutout 52 is configured to align with a part of the face of portion 53 when disposed thereagainst.

Figure 2:
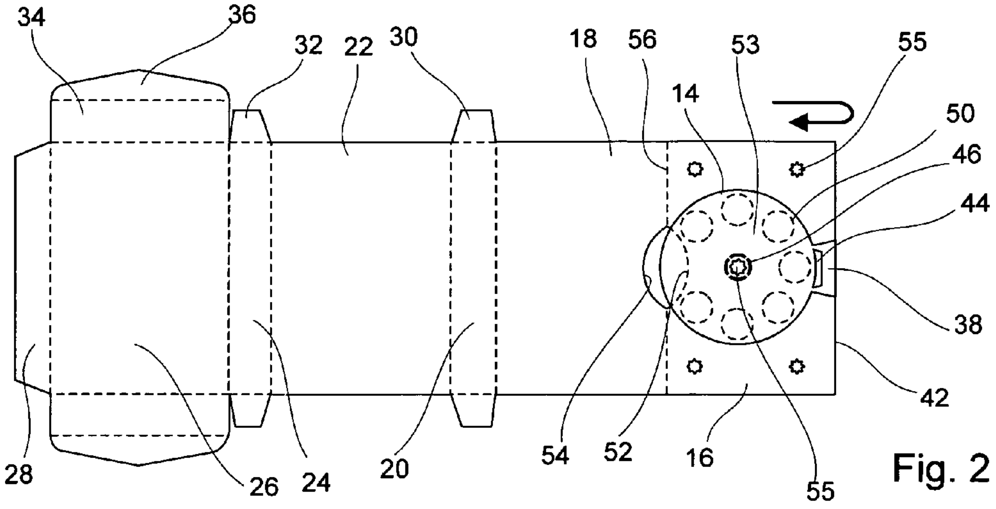
FIG. 2 is a view of the embodiment of FIG. 1 in a first stage folded condition.

This first fold, for example, is shown in FIG. 2. At this point, an adhesive material 55, such as glue, gum or other suitable tacky material, can be selectively applied in a single step to exposed facing of panel member 16 and detachable portion 46.

Figure 3:
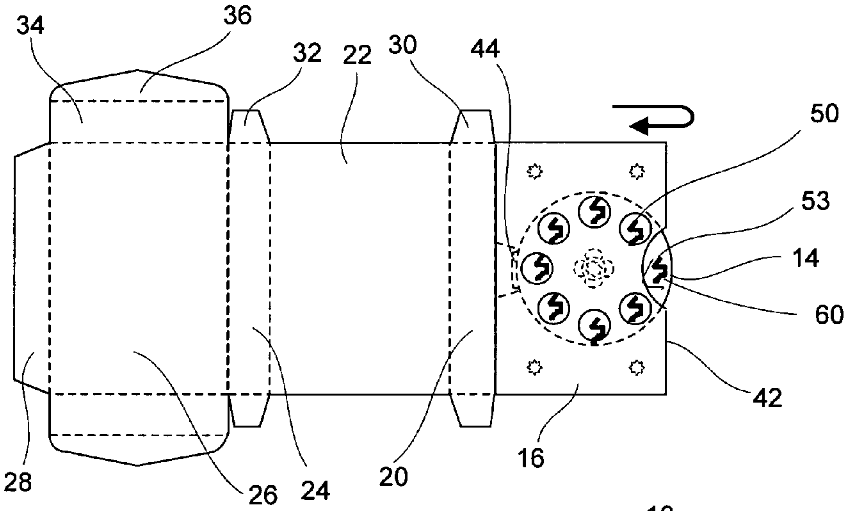
FIG. 3 is a view of the embodiment of FIG. 1 in a second stage folded condition.
Figure 4:
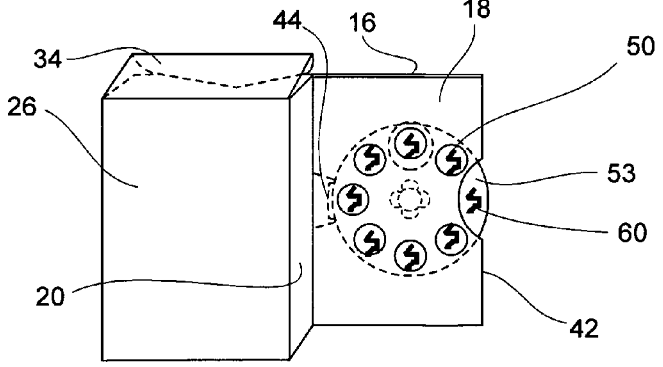
FIG. 4 is a plan view of an assembled condition of the embodiment of FIG. 1.

An opposing complementary cutout 54 is formed in an adjacent panel member 18. A fold 56 is formed between the panel members 16 and 18 and generally equally between the cutouts 52 and 54. Similarly, when the panel 18 is folded onto panels 14 and 16 and connected thereto by way of the adhesive material 55, the panel members 16 and 18 substantially enclose and retain the panel 14. The cutout 54 aligns with the cutout 52 when so connected as shown in FIGS. 3 and 4 as to permit the exposure of portion 53 as it is rotated. It is contemplated that printed indicia, such as advertising, or instructional information, can be made on both sides of the panel 14 as well as exposed sides of the remaining panels which make up the display 10.

Once so assembled, the exposed portion 53 which, for example, extends through cutouts 52 and 54, can be gripped and rotated. The rotation breaks the perforated portions 44 and 48.

Figure 5:
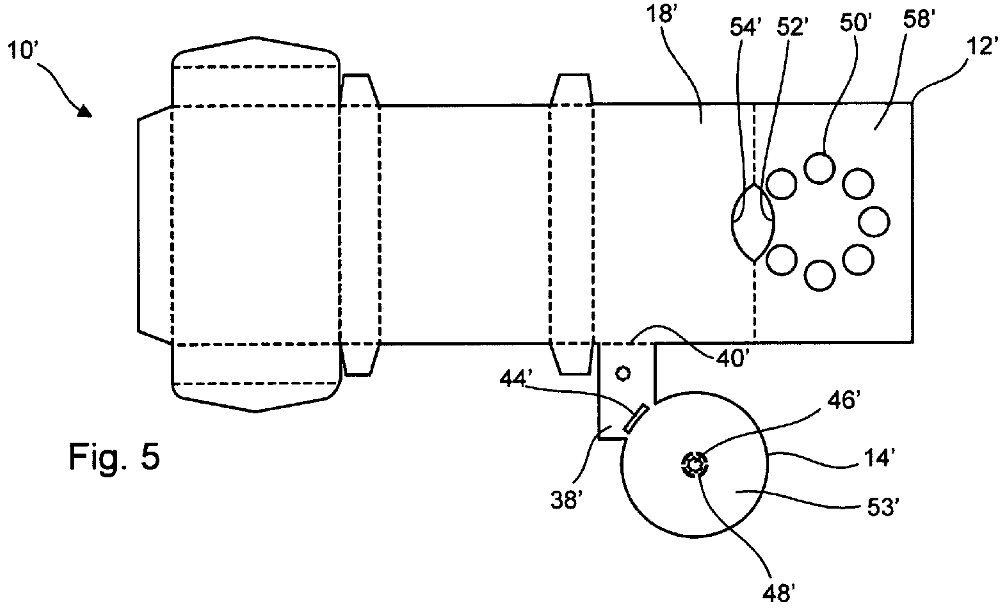
FIG. 5 depicts a view of another embodiment of the invention.

FIG. 5 shows an alternative embodiment wherein the panel member 14' is connected to panel 18' by way of a connecting tab 38'. The fold 40' is provided to readily permit the panel 14' to be folded onto panel member 18' and position the same in a manner similar to that described in FIG. 1. Assembly form this point is similar to that previously described.

Figure 6:
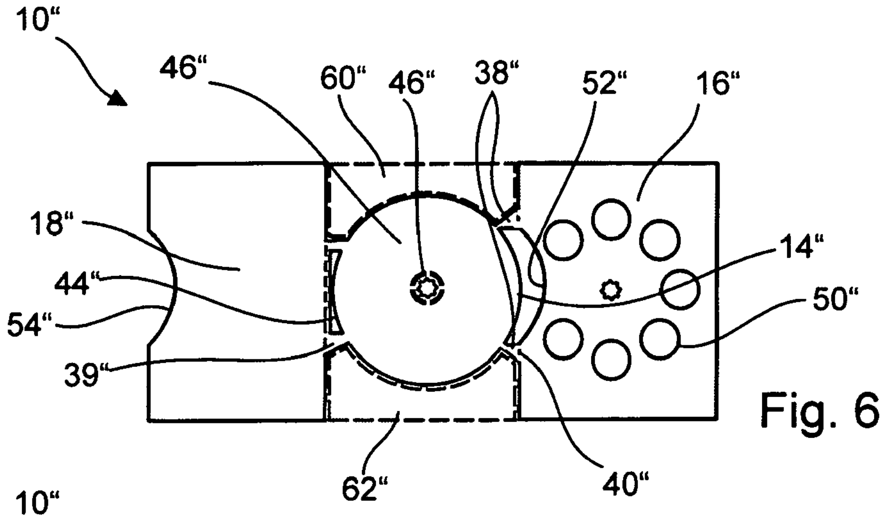
FIG. 6 depicts still a view of another embodiment of the invention.
Figure 7:
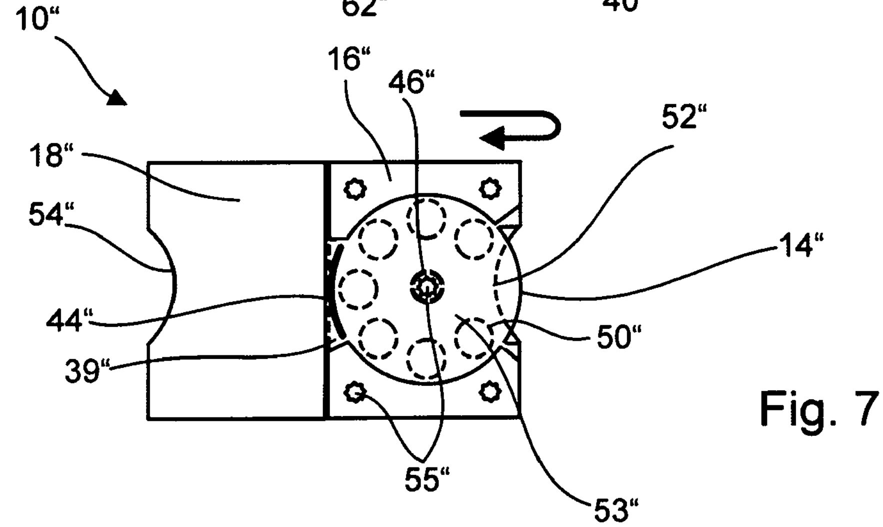
FIG. 7 is a view of the embodiment of FIG. 6 in a first stage folded condition.
Figure 8:
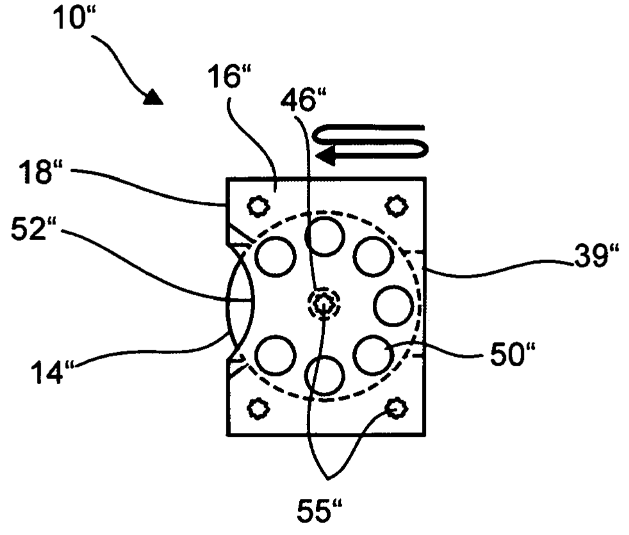
FIG. 8 is a view of the embodiment of FIG. 6 in a second stage folded condition.

FIGS. 6–8 illustrate another embodiment of the invention. Here, the panel member 14" is detachably connected to panel members 16" and 18" by way of tabs 38" and 39", respectively. The upper area 60" and lower area 62" depicts voids such that when the panel member 16" is disposed adjacent the panel member 14, a single step application of adhesive material can be applied as in the other embodiments.

The above described embodiments are set forth by way of example and are not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A display which comprises:

a first panel member:

a second panel member connected along a fold line to said first panel member wherein a cutout portion is formed on said fold line and extends partway into each said first panel member and said second panel member; and a third panel member, wherein said third panel member is generally retained by and between said first panel member and said second panel member when said first panel member is folded onto said second panel member in a manner in which at least part of said third panel member is exposed through said cutout portion and wherein said third panel member includes an integrally formed detachable portion which is adheringly connected to at least one of said first panel member and said second panel member and which provides a bearing surface upon which said third panel member rotates about generally between said first and second panel members and said first panel member and said second panel member each have an overlapping portion connected directly in a manner such that said third panel member remains free to rotate and said directly connected overlapping portions aids in retaining said third panel member, wherein said detachable portion is a perforated circular portion formed within the third panel member; and a fourth panel member connected along another fold line to said first panel member, wherein said fourth panel member is connected to and forms part of a container.

2. The display of claim 1, which further includes an indicia printed on said exposed part of said third panel member.

3. The display of claim 1, which further includes an indicia printed on an at least one of said panel members.

4. The display of claim 1, wherein said third panel member is manually detached from said detachable portion by rotation thereof.

* * * * *